United States Patent [19]
Posso

[11] Patent Number: 5,318,239
[45] Date of Patent: Jun. 7, 1994

[54] SPOOL FOR MAGNETIC COMPUTER TAPE

[75] Inventor: Patrick Posso, Pully, Switzerland

[73] Assignee: Rexton, Inc., Kerrville, Tex.

[21] Appl. No.: 915,632

[22] Filed: Jul. 21, 1992

[30] Foreign Application Priority Data

Jul. 23, 1991 [FR] France ................. 91 09305

[51] Int. Cl.⁵ ............... G11B 23/037; B65H 75/02
[52] U.S. Cl. ..................... 242/71.8; 242/118.61
[58] Field of Search ............ 242/71.8, 118.4, 118.6, 242/118.61

[56] References Cited

U.S. PATENT DOCUMENTS 4,296,890  10/1981  Posso ............... 242/71.8
4,723,731  2/1988  Posso ............... 242/71.8

FOREIGN PATENT DOCUMENTS 2259699  6/1974  Fed. Rep. of Germany .
1393607  5/1975  United Kingdom .

Primary Examiner—Daniel P. Stodola
Assistant Examiner—John Q. Nguyen
Attorney, Agent, or Firm—Dennison, Meserole, Pollack & Scheiner

[57] ABSTRACT

The spool comprises, on the one hand, a working part presenting, projecting on a side element, a winding sleeve and a drive hub joined together by an annular part sectioned in S form and contractable, on the other hand, a transparent part presenting, projecting on a side element, annular elements joined together by a part sectioned as a square and likewise contractable; welds are provided between these parts and made in order not to disturb the geometry of the spool.

10 Claims, 3 Drawing Sheets

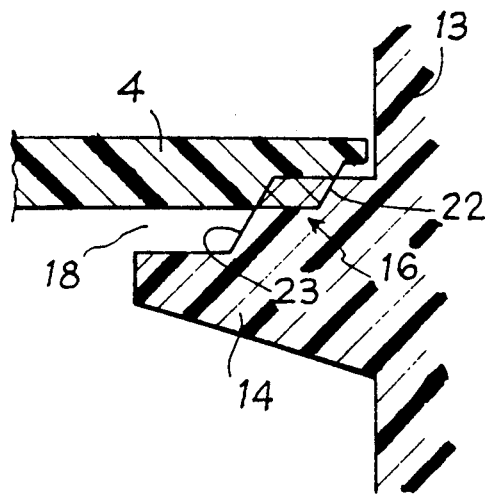
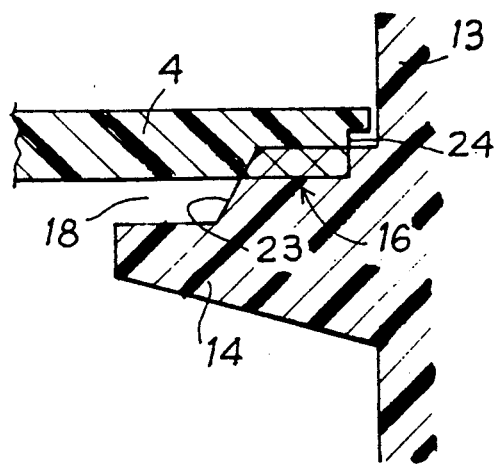
FIG. 2A  FIG. 2B
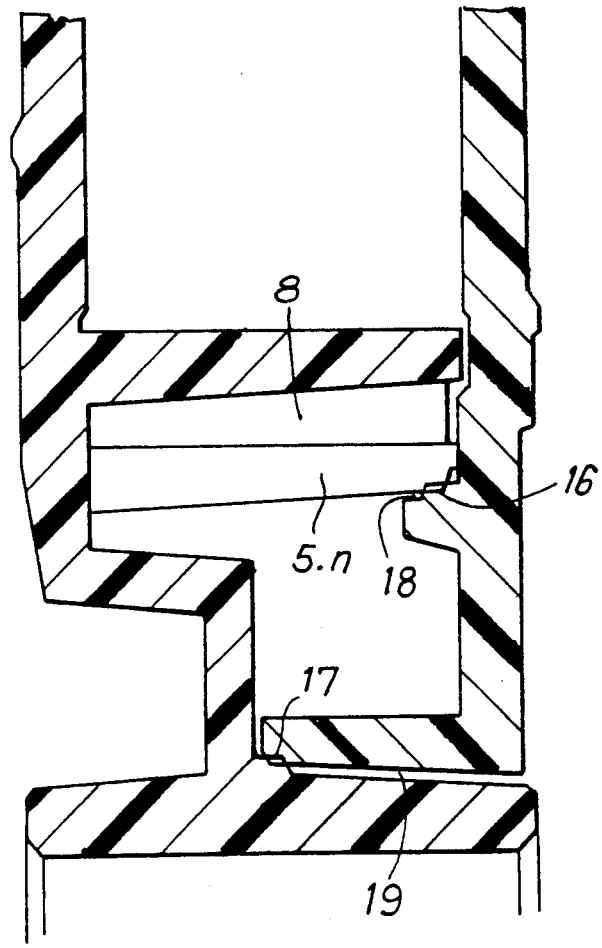
FIG. 5

SPOOL FOR MAGNETIC COMPUTER TAPE

FIELD OF THE INVENTION

The present invention relates to a spool for a magnetic computer tape or other supple support.

BACKGROUND OF THE INVENTION

A spool of this type is described in French Patent No. 2 147 473 and its corresponding United Kingdom Patent GB 1393607. It comprises only two parts made of moulded plastics material: an opaque one which is intended to support, alone, the tape during high-speed winding and unwinding thereof and the other, transparent, which is intended to be fixed in very supple manner in the first.

The opaque part is designed and produced to be very resistant. Firstly, the plastics material constituting it is reinforced with glass fibers. Secondly, its particular monolithic structure is, in principle, undeformable; in fact, this opaque part comprises a side element integral with a winding sleeve and a drive hub via a massive part. In this part are formed housings in which penetrate fingers integral with the transparent side element. The massive part then comprises very thick elements constituted by two rings joining an intermediate sleeve to the winding sleeve and to the drive hub, respectively. This massive part is very rigid and its rigidity is increased by ribs located between said housings and in particular joining the two sleeves together.

Consequently, the opaque part is very rigid and should be capable of supporting the efforts which stress it without deformation of the winding sleeve and without even partial transmission of these efforts to the drive hub which should therefore not be deformed.

In fact, the winding is slightly deformed when the magnetic tape is wound and this results in the magnetic tape pad not being geometrically perfect in that its side faces are not strictly plane and the tape floats laterally by a short measure during its advance, which disturbs the quality of the recording and the restitution of the signals. This also results in the disymmetrical contraction of the winding sleeve being accompanied by a tightening of the drive hub on the driving pin, rendering dismantling of the spool, not smooth and easy, but difficult due to the wedging.

These shortcomings occur even though the deformation of the winding sleeve is in fact very slight.

In order to avoid them, the step to be taken has always been the same: rigidify and reinforce the resistance of the central part of the spool. In this way, three-part spools made of plastics material employ a box structure in which the two lateral parts cooperate with an intermediate part.

This structure should, in principle, be satisfactory but, in practice, presents the same defect, even though it is attenuated.

In the two-part spool, the transparent side element comprises, on the one hand, projecting fingers penetrating in the housings in the opaque working part and, on the other hand, a central tubular sleeve of short height fitted around the drive hub. Free spaces are provided between the transparent fingers and the opaque sleeves as well as between the central transparent sleeve and the drive hub. Assembly of the two parts is obtained by depositing, before assembly, an adhesive which remains supple upon use, which replaces said spaces; consequently, the transparent part does not participate in the resistance of the opaque part.

On the contrary, in the three-part spool, assembly is effected by ultrasonic welding. Experience has shown that it is extremely difficult to effect such welding, as it is associated with the control of the clearance between the parts to be joined, which clearance is difficult to master due to the large number of identical moulds which are necessary to mass-produce the spools. Moreover, it is virtually impossible to render compatible any one of the moulds for manufacturing one part with any one of the moulds for manufacturing the second part and with any one of the moulds for manufacturing the third part, without having to make frequent adjustments or having to use specific assembly tools.

Under these conditions, either the clearance is too great and the relative positioning of the parts of the spool is defective, or the clearance is insufficient and the geometrical quality of the tape pad is doubtful, the transparent part not being able to vibrate freely.

It is an object of the present invention to design and produce a two-part spool so that all the difficulties of moulding and assembly are transferred to the opaque part and the resistance of the spool is ensured essentially by the opaque part virtually without the participation of the transparent part.

In this perspective, the present invention adopts a step contrary to the teaching of the prior art: it waives constituting a box structure between the winding sleeve and the drive hub, with or without the transparent part. Despite that, the invention aims at improving the quality of the tape pad of the two-part spool and at preventing the drive hub from contracting upon use, ensuring on the working part, between the winding sleeve and the drive hub, a supple connection thanks to which the sleeve may contract, but whilst conserving its cylindrical nature, whilst the hub must not deform at all, and concomitantly ensuring on the transparent part, between its inner projecting elements, a likewise supple connection thanks to which the above-mentioned mode of deformation of the working part is not disturbed but, on the contrary, corrected; it is not a question of a participation in the resistance but of a correction to the second degree of a possible lateral deformation of the supple connection of the opaque part. The purpose mentioned above is also attained by connecting the drive hub to the rest of the spool by means assimilable to a median semi-articulation and by placing between the two parts two ultrasonic welding beads under conditions such that the cylindrical nature of the tape pad is not affected and that the geometry of the spool as a whole is not disturbed.

Furthermore, the invention aims at the flatness of the side element of the opaque part being perfectly ensured and stabilized upon use in that the moulding of the central part of said opaque part and the winding of the magnetic tape must not influence nor disturb the flatness of said side element.

SUMMARY OF THE INVENTION

To that end and in accordance with the invention, the spool comprises, only two parts made of moulded plastics material of which an opaque part is working and of which the other, transparent one is virtually inert, the working part comprising a side element integral with a winding sleeve and with a drive hub, whilst the transparent part comprises a side element integral with at least one inner projecting portion intended to be definitively connected with at least one conjugate portion of the working part by connecting means.

The invention resides in that:

the winding sleeve and the drive hub of the working part made of non-reinforced plastics material are rigid and undeformable per se and extend in overhang, being separated from one another by a free space and having no inner and outer support, respectively, of the transparent side element, whilst an annular portion extending the side element and sectioned with the sleeve and the hub substantially in S form constitutes a relatively supple element having no ribbing which avoids transmission to the hub of the slight contraction of the sleeve due to the tape winding tension and which, however, ensures a sufficient hold of the working part for the axis of said sleeve to be always substantially parallel to the axis of the hub, an annular portion of the transparent part extending the side element presents an inner projecting element close to the hub and constitutes a second relatively supple element cooperating with said first relatively supple element of the working part in order subsidiarily to correct the principal deformation of said supple element of said working part, the relatively supple elements of the working part and of the transparent part are located substantially in the median zone of the hub, and at least two welding beads connect the conjugate annular contact portions and the supple elements.

Each connection means is advantageously an ultrasonic welding bead having a shear interface defined by two bearing surfaces of which at least one is conical relatively to the axis of the spool in order to ensure a permanent pre-centering of the opposite parts of the corresponding sonotrode, which pre-centering allows a functional radial clearance of assembly of said two parts greater than the clearance necessary and sufficient for the part energized by ultrasounds to be able to vibrate freely against the other which has remained inert, in order that the geometry of the spool is not disturbed by the welding.

A groove 25 is made in the side element of the working part around the winding sleeve so that moulding of this side element and that of this sleeve as well as of the annular part, although effected concomitantly in the same mould, do not mutually disturb one another.

According to a particularly advantageous embodiment, the side element of the working part is integral with the winding sleeve and with an inner lining sleeve connected together by ribs; ultrasonic welding beads proceeding by shear ensure rigid connection on the one hand of the free end of the inner sleeve with an inner annular bulge of the transparent side element and, on the other hand, of the free end of a tubular sleeve of the transparent part substantially perpendicular to the side element thereof with the drive hub near the annular part of the working part.

BRIEF DESCRIPTION OF THE DRAWINGS

The invention will be more readily understood on reading the following description with reference to the accompanying drawings, in which:

FIGS. 2A and 2B are enlarged views representing two embodiments of the detail designated by arrow F in FIG. 2.

FIGS. 3 to 5 are views similar to FIG. 2, showing other embodiments.

DETAILED DESCRIPTION OF THE DRAWINGS

Figure 1:
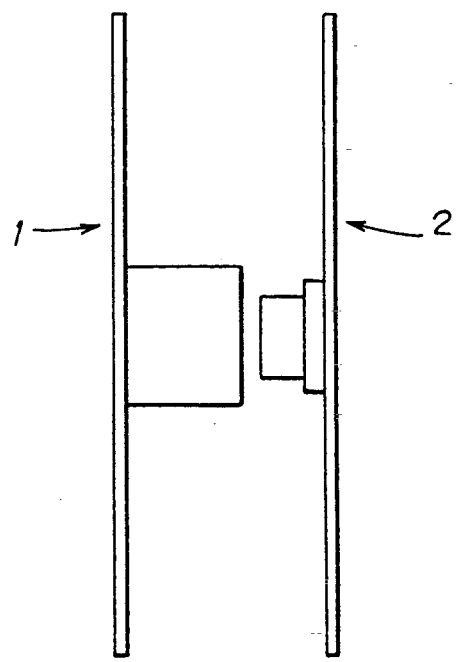
FIG. 1 is a view in elevation of a two-part spool according to the invention.

Referring now to the drawings, and firstly to FIG. 1, the spool comprises a very resistant opaque part 1 made of plastics material such as polystyrene for example. This plastics material is not reinforced in particular with glass fibers: this constitutes an advantage, since experience has shown that particles of glass fibers may, upon use, be detached from the spool and constitute a micropollution which is the origin of loss of data that the magnetic tape contains and which generates a handicap to the development of the density of data.

The spool also comprises a transparent part 2 made of "crystal" plastics material.

Figure 2:
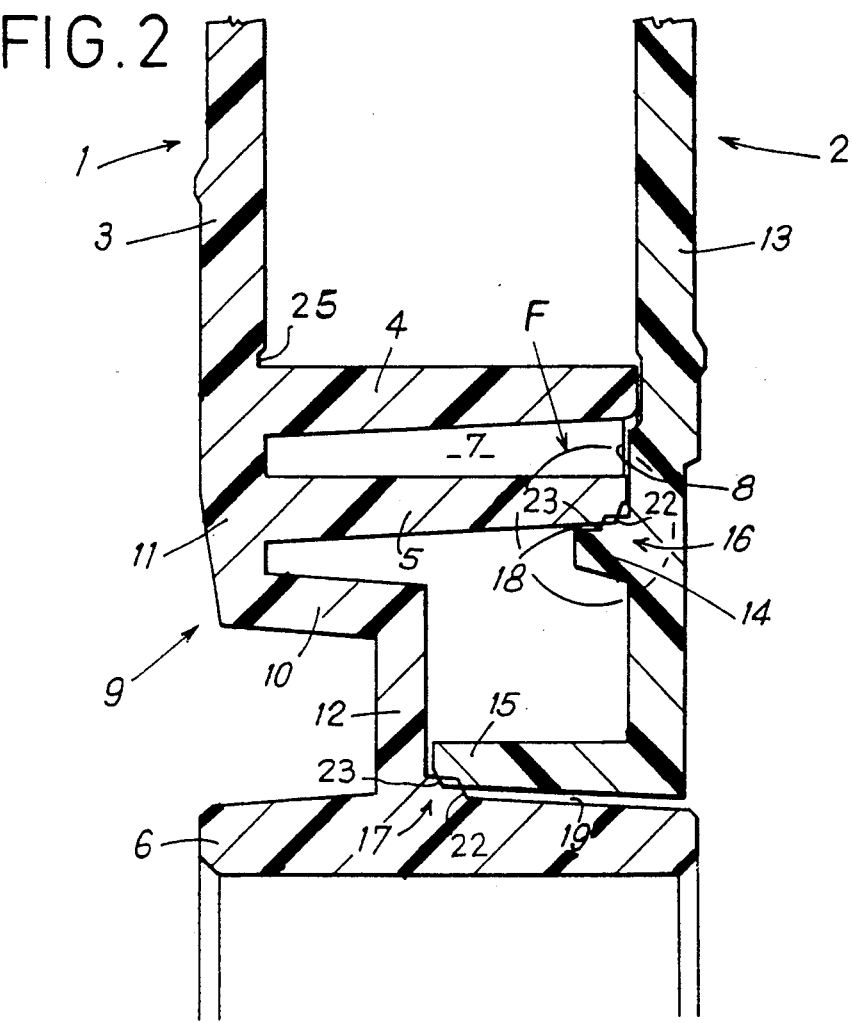
FIG. 2 is a partial half-section illustrating, on a larger scale, a first embodiment of the spool.

According to a first embodiment illustrated in FIG. 2, part 1 comprises a side element 3 integral with a peripheral cylindrical sleeve 4 for winding the magnetic tape, an inner lining sleeve 5 and a drive hub 6. The sleeves 4 and 5 are separated from one another by a free space 7 and joined together by ribs 8.

The side element 3 is integral with the drive hub 6 via an annular portion 9 comprising an intermediate sleeve 10 connected, on the one hand, to the winding sleeve 4 by a ring 11 extending the side element 3 and, on the other hand, to the drive hub 6 by a ring 12. Ring 12 is located substantially in the median zone of the drive hub. The annular portion 9 in cooperation with the sleeve 4 and the drive hub 6, is configured substantially as an S section and may be compressed during contraction of the winding sleeve 4, this configuration avoids the drive hub 6 also contracting. Compression of portion 9 is effected in a direction substantially parallel to the plane of the side element 3, so that, the drive hub being cylindrical, the sleeve also remains so during said compression. The median semi-articulation of annular portion 9 on drive hub 6 then makes it possible to conserve the flatness, and perpendicularity to the axis of the hub, of the side element 3, since the sleeve 4 remains cylindrical. Of course, it is desirable to avoid the lateral cant or annular portion 9 in order that the above condition of cylindrical form is respected and to that end, the transparent part 2 may intervene.

Part 2 comprises a side element 13 presenting an internally projecting annular bulge 14 and a tubular sleeve 15.

In the first embodiment according to FIG. 2, the annular bulge 14 is located beneath the inner lining sleeve 5 of part 1 and is fixed thereto by an annular ultrasonic shear welding bead 16. The tubular sleeve 15 extends outside the drive hub 6 of part 1 and is fixed in the corner of the angle formed by the drive hub and the ring 12 by an annular ultrasonic shear welding bead 17.

It is important to recall that ultrasonic welding is effected by pressing the opaque part 1 against the transparent part 2 and by applying on the latter, opposite each zone to be welded, a welding horn generating ultrasounds. For the ultrasounds to be able to vibrate the energized part 2 and heat it intensely by transduction so that it melts with the fixed part 1 in the zone of contact, it is necessary that a sufficient clearance be arranged between said parts. It is desirable that the functional clearance 18, 19 of assembly thereof be greater than the clearance necessary and sufficient for ultrasonic welding as, in fact, such a functional clearance is very difficult to master under the usual conditions of mass-produced moulding with numerous moulds for each part. As the functional clearance can be obtained without difficulty only with a relatively large tolerance range, it is essential that the ultrasonic welding be effected under excellent conditions without disturbing the geometry of the spool. Particular embodiments of the shear surface are employed.

According to a first mode of execution illustrated in FIG. 2A, the shear interface of each weld, 16 for example, is defined by two conical bearing surfaces 22 and 23 formed concentrically to the axis of the spool at the end of the lining sleeve 5 of the opaque part 1 and at the foot of the bulge 14 of the transparent part, respectively. These bearing surfaces make it possible to obtain a permanent pre-centering of the opposite parts of the sonotrode and thus to annihilate the disturbing effect possibly made by the functional clearance of assembly which is greater than the clearance necessary for the vibration of the transparent part.

According to a second mode of execution illustrated in FIG. 2B, the conical bearing surface 23 of the bulge 14 cooperates with a linear bearing surface 24 which is perpendicular to the axis of the spool. The effect of pre-centering is also observed in this case.

It is also important to note that side element 13 and tubular sleeve 15 form a relatively supple connection which may be deformed in order possibly to correct the defects in contraction of S-shaped portion 9 of the opaque working part 1.

The opaque lining sleeve 5 abuts against the transparent side element 13, while winding sleeve 4 is slightly spaced apart therefrom to ensure a correct positioning of the first turns of the magnetic tape pad. At the angle formed by side element 3 and winding sleeve 4, a groove 25 is formed by an addition of steel in the molding tool, to prevent geometrical micro defects. Moulding of part 1 may then be effected under such conditions that the flatness of the side element and the cylindrical form of the winding sleeve may be obtained without disturbing interferences of their respective phases of moulding on one another.

Figure 3:
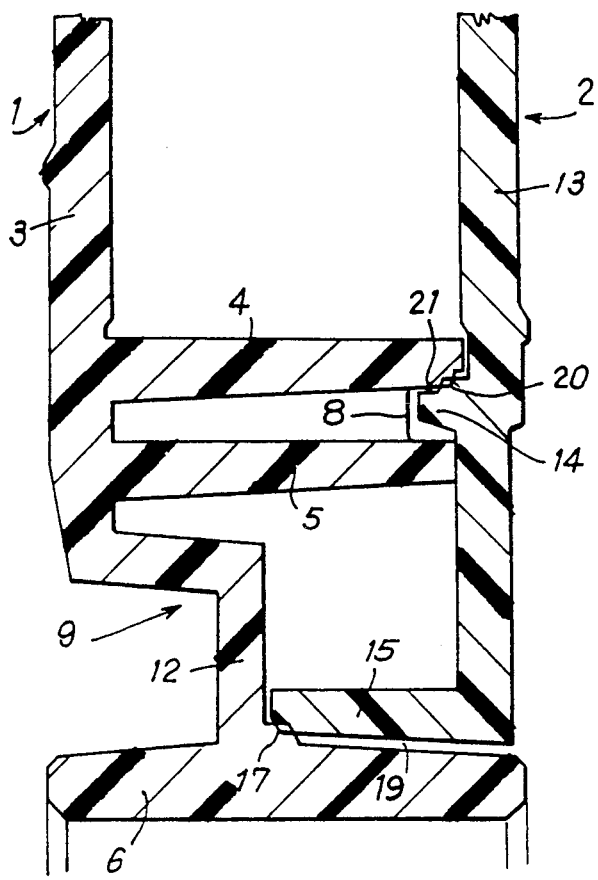

The second embodiment illustrated in FIG. 3 differs from the first according to FIG. 2, in that the bulge 14 is interposed between the sleeves 4 and 5, the ribs 8 being less long, and in that an ultrasonic welding bulge 20 connects said bead to the sleeve 4, between which a clearance 21 similar to the preceding ones 18 and 19, is made.

Figure 4:
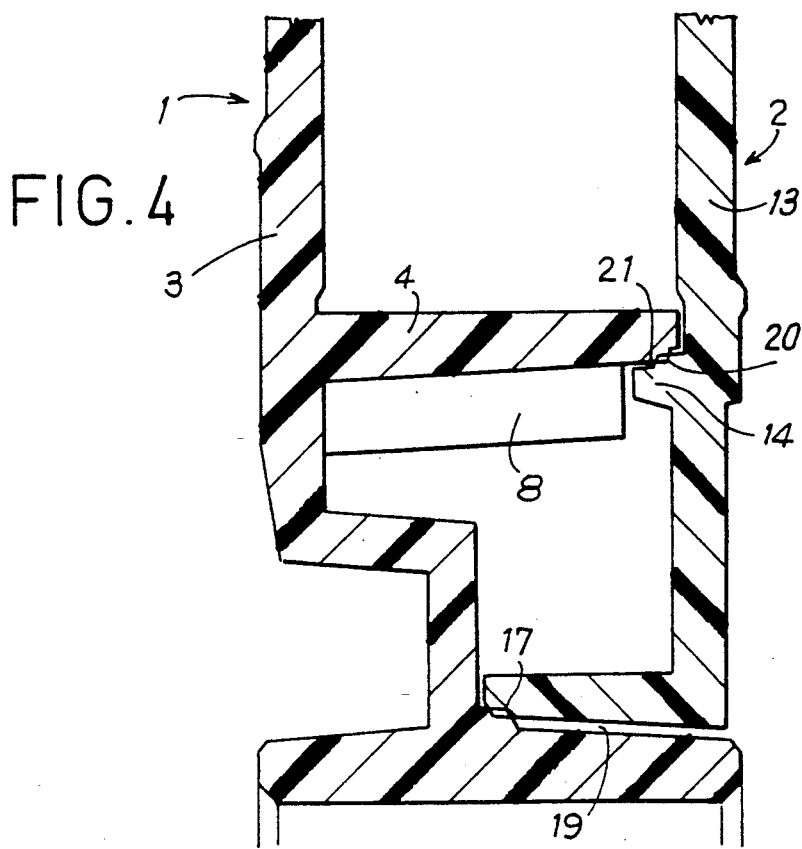

The third embodiment illustrated in FIG. 4 differs from the second in that the lining sleeve 5 is eliminated and the ribs 8 are more extended radially.

The fourth embodiment illustrated in FIG. 5 is similar to the first (FIG. 2) except that the sleeve 5 is replaced by a plurality of sections 5.n integral with the ribs 8 and separated from one another by slots, the welding bead 16 being interrupted at the location of said slots.

The ultrasonic welds may, of course, be replaced by rotary finishing welds.

What is claimed is:

1. A spool for magnetic computer tape constituted by only two parts made of moulded plastic material of which a working part for taking up the tape is opaque and of which the other part is virtually inert and transparent, the working part comprising a side element formed integral with a cylindrical sleeve having a first annular contact portion and a drive hub; the transparent part comprising a side element formed integral with an inner projecting part of a length substantially less than the length of the cylindrical sleeve including a second annular contact portion intended to be connected with the first annular contact portion of the working part by rigid connecting means, wherein:

the cylindrical sleeve and the drive hub of the working part are made of non-reinforced plastics material, are rigid, extend towards the transparent part and are separated from one another by an annular part and a ring connected to the annular part;

the annular part extending from the working part side element and showing together with the ring, the cylindrical sleeve and the drive hub a substantially S-form section which constitutes a first relatively supple element having no ribbing so as to accommodate slight contraction of the cylindrical sleeve due to winding the tape under tension to avoid transmission of said slight contraction to the drive hub, to ensure a sufficient hold of the working part for the axis of said cylindrical sleeve to be always substantially parallel to the axis of the drive hub;

the transparent part further having a tubular portion extending towards the working part from the side element and which is an inner projecting element ending close to the hub and constituting a second relatively supple element cooperating with the first relatively supple element of the working part in order to correct any possible deformation of said first supple element;

the relatively supple elements of the working part and of the transparent part are located substantially in the median zone of the drive hub, and the rigid connection means comprises a first welding bead connecting the first and second annular contact portions and a second welding bead connecting the relatively supple elements.

2. The spool of claim 1, wherein the first and the second welding bead are ultrasonic welding beads each having a shear interface defined by two bearing surfaces of which at least one is conical relative to the axis of the spool in order to ensure a permanent pre-centering of the parts opposite a corresponding welding horn, which pre-centering allows a functional radial clearance of assembly of the two parts greater than the clearance necessary and sufficient for the part energized by ultrasounds to be able to vibrate freely against the other part, in order that the geometry of the spool is not disturbed by the welding.

3. The spool of claim 1, wherein a groove is made in the side element of the working part around the cylindrical sleeve so that moulding of this side element and of this cylindrical sleeve as well as of the annular part, although effected concomitantly in the same mould, do not mutually disturb one another.

4. The spool of claim 1, wherein the side element of the working part is integral with the cylindrical sleeve, the cylindrical sleeve includes an inner lining sleeve and the sleeves are connected together by ribs.

5. The spool of claim 4, wherein said inner lining sleeve has a free end, each welding bead is an ultrasonic welding bead each ultrasonic welding bead proceeding by shear ensures rigid connection on the one hand of the free end of the inner lining sleeve with the second annular contact portion of the transparent side element and, on the other hand, of the free end of the tubular portion of the transparent part which is substantially perpendicular to the side element thereof, with the drive hub near the annular part of the working part.

6. The spool of claim 1, wherein the side element of the working part is integral with the cylindrical sleeve and with ribs projecting from a radially inner surface of the latter, wherein said cylindrical sleeve is a winding sleeve with a free end, the free end of this winding sleeve being slightly spaced apart from the side element of the transparent part.

7. The spool of claim 5, wherein each welding bead is an ultrasonic welding bead, each ultrasonic welding bead proceeding by shear ensures rigid connection on the one hand of the free end of the winding sleeve with the second annular contact portion of the transparent side element and, on the other hand, of the free end of the tubular portion of the transparent part which is substantially perpendicular to the side element thereof, with the drive hub near the annular part of the working part.

8. The spool of claim 1 wherein the cylindrical sleeve includes an outer winding sleeve and an inner lining sleeve which has a free end, said inner lining sleeve is located inside the winding sleeve and separated from said winding sleeve by a free space, wherein said first annular contact portion is close to the lining sleeve and the tubular portion has a free end and wherein each of the welding beads are ultrasonic inner annular welding beads each of which has a shear interface defined by two bearing surfaces of which at least one is conical relative to the axis of the spool, one of the beads ensuring a rigid connection of the free end of the lining sleeve with said annular contact portion formed on the transparent part whereas the other bead ensures a rigid connection of the free end of said tubular portion of said transparent part with the drive hub and near the ring of said working part.

9. The spool of claim 8 wherein said shear interface of a first of said welding beads is defined by two conical bearing surfaces formed concentrically to the axis of the spool respectively at the end of the lining sleeve and at the foot of an inner projecting part in the form of an annular bulge which forms said second annular contact portion.

10. The spool of claim 8 wherein said shear interface of a second of said welding beads is defined by two conical bearing surfaces formed concentrically to the axis of the spool respectively on the drive hub near the ring of the working piece and on the free end of said tubular portion.

* * * * *